United States Patent
Chu et al.

(10) Patent No.: US 10,469,210 B2
(45) Date of Patent: **\*Nov. 5, 2019**

(54) ACKNOWLEDGMENT DATA UNIT FOR DATA UNIT FRAGMENT

(71) Applicant: Marvell World Trade Ltd., St. Michael (BB)

(72) Inventors: Liwen Chu, San Ramon, CA (US); Lei Wang, San Diego, CA (US); Jinjing Jiang, San Jose, CA (US); Hongyuan Zhang, Fremont, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 310 days.

This patent is subject to a terminal disclaimer.

(21) Appl. No.: 15/360,538

(22) Filed: Nov. 23, 2016

(65) Prior Publication Data

US 2017/0149536 A1    May 25, 2017

Related U.S. Application Data

(60) Provisional application No. 62/259,220, filed on Nov. 24, 2015, provisional application No. 62/369,567, filed on Aug. 1, 2016.

(51) Int. Cl.
*H04L 1/18* (2006.01)
*H04L 27/26* (2006.01)
(Continued)

(52) U.S. Cl.
CPC .............. *H04L 1/1861* (2013.01); *H04L 1/08* (2013.01); *H04L 1/1614* (2013.01);
(Continued)

(58) Field of Classification Search
CPC ... H04L 1/1825; H04L 5/0044; H04L 5/0007; H04L 27/2608; H04L 1/08; H04L 1/1614;
(Continued)

(56) References Cited

U.S. PATENT DOCUMENTS 8,175,047 B2    5/2012    Seok et al.
10,045,367 B2   8/2018    Ding et al.
(Continued)

OTHER PUBLICATIONS

International Search Report and Written Opinion in International Patent Application No. PCT/US2015/063599, dated Apr. 11, 2017 (22 pages).

(Continued)

*Primary Examiner* — Mounir Moutaouakil

(57) ABSTRACT

A method for acknowledging a first medium access control (MAC) service data unit (MSDU) is described. A first aggregate MAC protocol data unit (A-MPDU) of a first orthogonal frequency division multiple access (OFDMA) data unit is received at a first communication device from a second communication device. The first A-MPDU includes a first fragment of a plurality of fragments of the first MSDU. A second A-MPDU of a second OFDMA data unit is received at the first communication device from the second communication device. The second A-MPDU includes a second fragment of the plurality of fragments and the second fragment is an end fragment of the plurality of fragments. A fragment acknowledgment data unit is generated by the first communication device to acknowledge receipt of each of the plurality of fragments of the first MSDU. The fragment acknowledgment data unit is caused to be transmitted to the second communication device.

10 Claims, 9 Drawing Sheets

(51) Int. Cl.
| | |
|---|---|
| *H04W 28/08* | (2009.01) |
| *H04W 28/06* | (2009.01) |
| *H04W 72/04* | (2009.01) |
| *H04L 5/00* | (2006.01) |
| *H04L 1/16* | (2006.01) |
| *H04L 1/08* | (2006.01) |
| H04W 84/12 | (2009.01) |
| H04L 1/00 | (2006.01) |

(52) U.S. Cl.
CPC .......... *H04L 1/1621* (2013.01); *H04L 1/1635* (2013.01); *H04L 1/1825* (2013.01); *H04L 5/0007* (2013.01); *H04L 5/0044* (2013.01); *H04L 27/26* (2013.01); *H04L 27/2608* (2013.01); *H04W 28/06* (2013.01); *H04W 28/08* (2013.01); *H04W 72/04* (2013.01); H04L 2001/0092 (2013.01); H04W 28/065 (2013.01); H04W 84/12 (2013.01)

(58) Field of Classification Search
CPC ..... H04L 27/26; H04L 1/1621; H04L 1/1635; H04L 2001/0092; H04W 72/04; H04W 28/065; H04W 84/12; H04W 28/06; H04W 28/08
See application file for complete search history.

(56) References Cited

U.S. PATENT DOCUMENTS

| | | | |
|---|---|---|---|
| 10,135,565 | B2 | 11/2018 | Liu et al. |
| 10,171,206 | B2 | 1/2019 | Cohn et al. |
| 2004/0258092 | A1 | 12/2004 | Sugaya |
| 2005/0114489 | A1 | 5/2005 | Yonge et al. |
| 2005/0165950 | A1 | 7/2005 | Takagi et al. |
| 2005/0238054 | A1 | 10/2005 | Sharma |
| 2005/0265371 | A1 | 12/2005 | Sharma et al. |
| 2006/0034317 | A1 | 2/2006 | Hong et al. |
| 2006/0048034 | A1 | 3/2006 | Cho |
| 2006/0171353 | A1 | 8/2006 | Nagata et al. |
| 2007/0258384 | A1 | 11/2007 | Sammour et al. |
| 2008/0095184 | A1 | 4/2008 | Yashima et al. |
| 2011/0110343 | A1 | 5/2011 | Venkatachalam et al. |
| 2012/0314636 | A1 | 12/2012 | Liu |
| 2013/0003678 | A1 | 1/2013 | Quan et al. |
| 2013/0176939 | A1 | 7/2013 | Trainin et al. |
| 2013/0229996 | A1 | 9/2013 | Wang et al. |
| 2013/0230059 | A1 | 9/2013 | Quan et al. |
| 2014/0112322 | A1 | 4/2014 | Ram et al. |
| 2015/0131517 | A1 | 5/2015 | Chu et al. |
| 2015/0349927 | A1 | 12/2015 | Cohn et al. |
| 2016/0100421 | A1 | 4/2016 | Ding et al. |
| 2016/0182205 | A1* | 6/2016 | Asterjadhi ............ H04L 5/0055 370/329 |
| 2017/0063509 | A1* | 3/2017 | Kim ....................... H04L 5/0055 |
| 2017/0201343 | A1 | 7/2017 | Merlin et al. |
| 2017/0244531 | A1 | 8/2017 | Chu et al. |
| 2017/0338914 | A1 | 11/2017 | Chu et al. |

OTHER PUBLICATIONS

U.S. Appl. No. 15/669,884, Chu et al., "Transmitter Defragmentation for Data Unit Fragments," filed Aug. 4, 2017.

International Preliminary Report on Patentability in International Application No. PCT/US2016/063599, dated Jun. 7, 2018 (14 pages).

IEEE Std 802.11ac™—2013 "IEEE Standard for Information Technology-Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-425 (Dec. 18, 2013).

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

Invitation to Pay Fees and Partial International Search Report for International Patent Application No. PCT/US2016/063599, dated Feb. 21, 2017 (10 pages).

Hiertz et al., "Mesh Networks Alliance (MNA) Proposal—IEEE 802.11s—MAC Sublayer Functional Description—IEEE 802.11s—Mesh WLAN Security," IEEE Draft 802.11-05/0605r22, vol. 802. 11s, No. 2, pp. 1-46 (Nov. 8, 2005).

Yanover et al., "Data Integrity in 802.16.4 MAC," IEEE Draft, IEEE 802.16 Broadband Wireless Access Working Group, vol. 802.16a, pp. 1-10 (Jan. 14, 2001).

Office Action in U.S. Appl. No. 15/669,884, dated Jan. 10, 2019 (17 pages).

IEEE Std 802.11ac/D7.0, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).

IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).

IEEE Std 802.11-REVmc™/D8.0 (revision of IEEE Std. 802.11™—2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

Chen, "Home Network Basis: Transmission Environments and Wired/Wireless Protocols," Prentice Hall, pp. 1-26 (Jul. 2006).

Hiertz et al., "The IEEE 802.11 Universe," IEEE Communications Magazine, pp. 62-70, (Jan. 2010).

Seok et al., "HEW PPDU Format for Supporting MIMO-OFDMA," IEEE 802.11-14/1210r0, Sep. 14, 2014 (16 pages).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

(56) References Cited

OTHER PUBLICATIONS

Tandai et al., "An Efficient Uplink Multiuser MIMO Protocol in IEEE 802.11 WLAN5," IEEE 20th International Symposium on Personal, Indoor and Mobile Radio Communications (PIMRC 2009), pp. 1153-1157 (Sep. 13, 2009).

\* cited by examiner

ACKNOWLEDGMENT DATA UNIT FOR DATA UNIT FRAGMENT

CROSS-REFERENCES TO RELATED APPLICATIONS

This application claims the benefit of U.S. Provisional Patent Application No. 62/259,220, entitled "A-MPDU with Fragment in MU PPDU," filed on Nov. 24, 2015, the disclosure of which is incorporated herein by reference in its entirety. Additionally, this application claims the benefit of U.S. Provisional Patent Application No. 62/369,567, entitled "A-MPDU with Fragment In MU PPDU," filed on Aug. 1, 2016.

FIELD OF THE DISCLOSURE

The present disclosure relates generally to communication networks and, more particularly, to wireless local area networks that utilize orthogonal frequency division multiplexing (OFDM).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An ever-increasing number of relatively inexpensive, low power wireless data communication services, networks and devices have been made available over the past number of years, promising near wire speed transmission and reliability. Various wireless technologies is described in detail in the IEEE 802.11 Standards, including for example, the IEEE Standards 802.11a/b/g, 802.11n, and 802.11ac and their updates and amendments, as well as the IEEE Standard 802.11ax now in the process of being adopted, all of which are collectively incorporated herein fully by reference. These standards and draft standards specify various methods of establishing connections between wireless devices. For example, in an infrastructure mode, wireless devices must first connect with a wireless access point and all communications occur via the access point. On the other hand, in an ad hoc mode, wireless devices can connect and communicate with each other directly, as opposed to communicating via an access point.

SUMMARY

In an embodiment, a method for acknowledging a first medium access control (MAC) service data unit (MSDU) includes: receiving, at a first communication device and from a second communication device, a first aggregate MAC protocol data unit (A-MPDU) of a first orthogonal frequency division multiple access (OFDMA) data unit, wherein the first A-MPDU includes a first fragment of a plurality of fragments of the first MSDU; receiving, at the first communication device and from the second communication device, a second A-MPDU of a second OFDMA data unit, wherein the second A-MPDU includes a second fragment of the plurality of fragments of the first MSDU and the second fragment is an end fragment of the plurality of fragments of the first MSDU; generating, by the first communication device, a fragment acknowledgment data unit to acknowledge receipt of each of the plurality of fragments of the first MSDU; and causing, by the first communication device, the fragment acknowledgment data unit to be transmitted to the second communication device.

In another embodiment, a first communication device for acknowledging a first medium access control (MAC) service data unit (MSDU) includes a network interface device having one or more integrated circuits. The one or more integrated circuits are configured to receive, from a second communication device, a first aggregate MAC protocol data unit (A-MPDU) of a first orthogonal frequency division multiple access (OFDMA) data unit, wherein the first A-MPDU includes a first fragment of a plurality of fragments of the first MSDU, receive, from the second communication device, a second A-MPDU of a second OFDMA data unit, wherein the second A-MPDU includes a second fragment of the plurality of fragments of the first MSDU and the second fragment is an end fragment of the plurality of fragments of the first MSDU, generate a fragment acknowledgment data unit to acknowledge receipt of each of the plurality of fragments of the first MSDU, and cause the fragment acknowledgment data unit to be transmitted to the second communication device.

In an embodiment, a method for simultaneously communicating with multiple communication devices in a wireless local area network includes: dividing, at a first communication device, a first medium access control (MAC) service data unit (MSDU) into a plurality of fragments, wherein the first MSDU is intended for a second communication device of the multiple communication devices; generating, at the first communication device, multiple MAC protocol data units (MPDUs) intended for the multiple communication devices, wherein the multiple MPDUs include a first MPDU that includes a first fragment of the plurality of fragments and is an only MPDU of the multiple MPDUs intended for the second communication device; generating, at the first communication device, a first orthogonal frequency division multiple access (OFDMA) data unit that includes the multiple MPDUs intended for the multiple communication devices; causing, by the first communication device, the first OFDMA data unit to be transmitted to the multiple communication devices.

In another embodiment, a first communication device for simultaneously communicating with multiple communication devices in a wireless local area network includes a network interface device having one or more integrated circuits. The one or more integrated circuits are configured to: divide a first medium access control (MAC) service data unit (MSDU) into a plurality of fragments, wherein the first MSDU is intended for a second communication device of the multiple communication devices, generate multiple MAC protocol data units (MPDUs) intended for the multiple communication devices, wherein the multiple MPDUs include a first MPDU that includes a first fragment of the plurality of fragments and is an only MPDU of the multiple MPDUs intended for the second communication device, generate a first orthogonal frequency division multiple access (OFDMA) data unit that includes the multiple MPDUs, and cause the first OFDMA data unit to be transmitted to the multiple communication devices.

In an embodiment, a method for simultaneously communicating with multiple communication devices in a wireless local area network includes: dividing, at a first communication device, a first medium access control (MAC) service data unit (MSDU) into a plurality of fragments, wherein the first MSDU is intended for a second communication device of the multiple communication devices; generating, at the first communication device, first multiple MAC protocol data units (MPDUs) intended for the multiple communication devices, wherein the first multiple MPDUs include a first MPDU that includes a first fragment of the plurality of fragments and is intended for the second communication device; generating, at the first communication device, a first orthogonal frequency division multiple access (OFDMA) data unit that includes the first multiple MPDUs intended for the multiple communication devices; causing, by the first communication device, the first OFDMA data unit to be transmitted to the multiple communication devices; generating, at the first communication device, second multiple MAC protocol data units (MPDUs) intended for the multiple communication devices, wherein the second multiple MPDUs include a second MPDU that includes the first MSDU in its entirety and is intended for the second communication device; generating, at the first communication device, a second orthogonal frequency division multiple access (OFDMA) data unit that includes the second multiple MPDUs intended for the multiple communication devices; and causing, by the first communication device, the second OFDMA data unit to be transmitted to the multiple communication devices.

DETAILED DESCRIPTION

In embodiments described below, a wireless network device such as an access point (AP) of a wireless local area network (WLAN) simultaneously transmits independent data streams to multiple client stations and/or receives independent data streams simultaneously transmitted by multiple client stations. For example, the AP transmits data for the multiple clients in different orthogonal frequency division multiplexing (OFDM) sub-channels of an orthogonal frequency division multiple access (OFDMA) transmission, in an embodiment. Similarly, multiple client stations transmit data to the AP simultaneously, in particular, each client station transmits data in a different OFDM sub-channel of an OFDMA transmission, in an embodiment. In another embodiment, the AP transmits data for multiple client stations using different spatial streams of a multi-user multiple input multiple output (MU-MIMO) transmission. Similarly, multiple client stations transmit data to the AP simultaneously using different spatial streams within an MU-MIMO transmission to the AP, in an embodiment. In some embodiments and/or scenarios where the data streams include physical layer (PHY) data units that are shorter than a media access control (MAC) service data unit (MSDU), the MSDU is fragmented to be transmitted via multiple PHY data units or via multiple MPDUs with an aggregate MPDU.

In an embodiment, upon receiving simultaneous transmissions from multiple client stations, the AP acknowledges receipt of the simultaneous transmissions by transmitting one or more acknowledgement frames to the client stations. For example, in an embodiment, the AP transmits an OFDMA acknowledgement frame that includes respective acknowledgements intended for different client stations in different OFDM sub-channels, in an embodiment. In another embodiment, the AP transmits an MU-MIMO acknowledgment frame that includes respective acknowledgements intended for different client stations transmitted in different spatial streams. In yet another embodiment, the AP transmits a broadcast acknowledgement frame in a single user (SU) PHY protocol data unit (PPDU) or multi-user (MU) PPDU that is broadcast to the multiple client stations and includes the respective acknowledgements intended for the multiple client stations, or a multicast acknowledgement frame that is multicast to the multiple client stations and includes the respective acknowledgements intended for the multiple client stations. The AP acknowledges receipt of simultaneous transmissions from multiple client stations in other suitable manners, in other embodiments.

Figure 1:
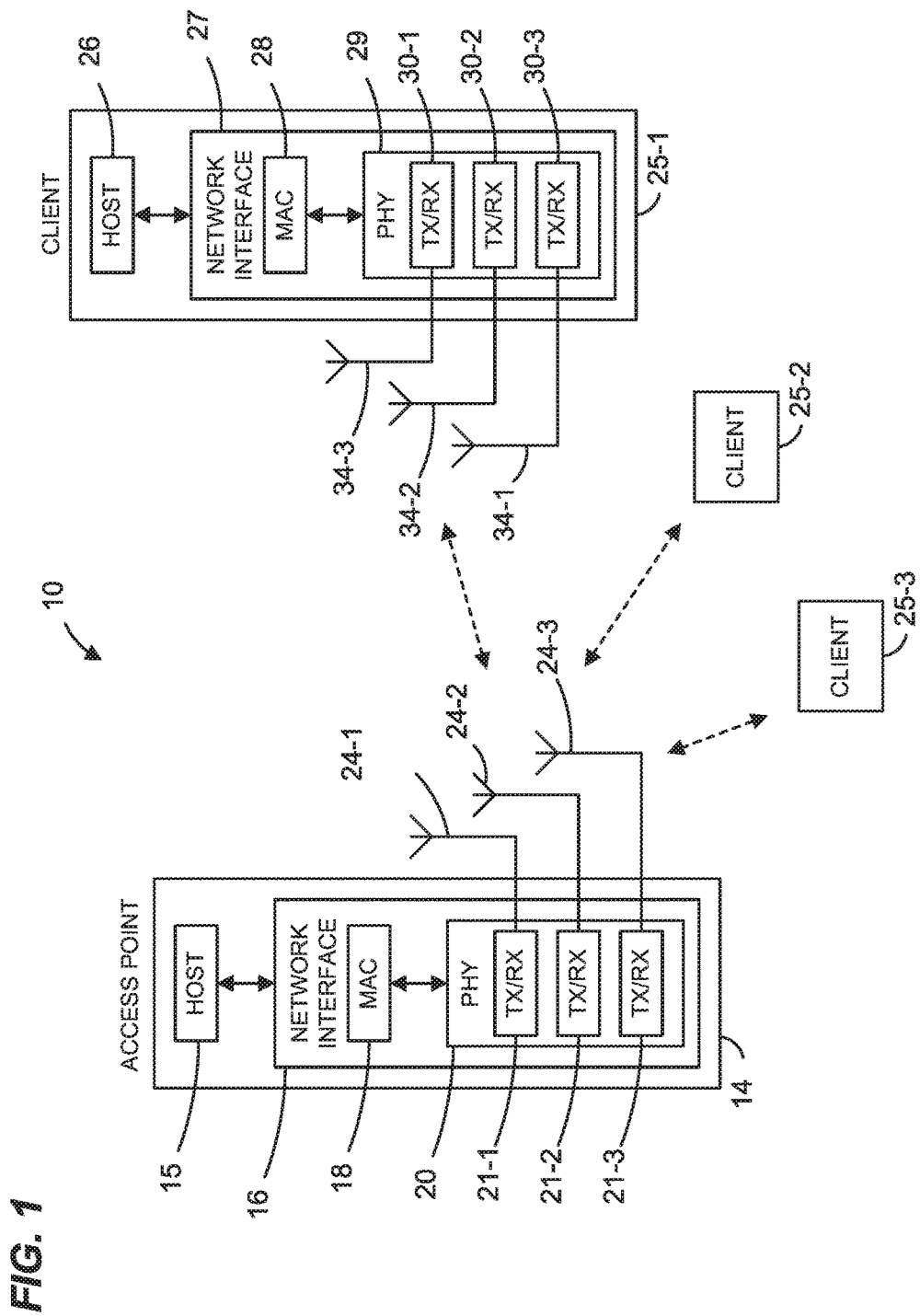
FIG. 1 is a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface 16. In an embodiment, the network interface 16 includes one or more integrate circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In various embodiments, the MAC processor 18 and the PHY processor 20 are configured to operate according to a first communication protocol (e.g., a High Efficiency, HE, or 802.11ax communication protocol). In some embodiments, the MAC processor 18 and the PHY processor 20 are also configured to operate according to a second communication protocol (e.g., according to the IEEE 802.11ac Standard). In yet another embodiment, the MAC processor 18 and the PHY processor 20 are additionally configured to operate according to the second communication protocol, a third communication protocol, and/or a fourth communication protocol (e.g., according to the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 or another communication device (not shown) is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure that is the same as or similar to the client station 25-1. In an embodiment, the client station 25-3 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and the PHY processor 20 of the AP 14 are configured to generate data units conforming to the first communication protocol and having formats described herein. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MPDUs, MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various embodiments.

In various embodiments, the MAC processor 28 and the PHY processor 29 of the client station 25-1 are configured to generate data units conforming to the first communication protocol and having formats described herein. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client station 25-1 are configured to process received data units conforming to the first communication protocol and having formats described hereinafter and to determine that such data units conform to the first communication protocol, according to various embodiments.

In various embodiments and/or scenarios, an MSDU is divided into a plurality of fragments and one or both of the AP 14 and the client station 25 are configured to receive first and second OFDMA data unit that include the fragments. The AP 14 or client station 25 generates an acknowledgment data unit to acknowledge receipt of the plurality of fragments. In an embodiment and/or scenario, an OFDMA data unit includes a single MPDU that includes a fragment of an MSDU intended for a recipient (e.g., for the AP 14 or client station 25). In an embodiment and/or scenario, an OFDMA data unit includes an aggregate MPDU that includes one or more fragments of an MSDU intended for a recipient. In some embodiments and/or scenarios, a recipient generates and transmits an acknowledgment for a fragment in response to receipt of the fragment. In other embodiments and/or scenarios, a recipient generates and transmits a single acknowledgment for the plurality of fragments of an MSDU.

Figure 2:
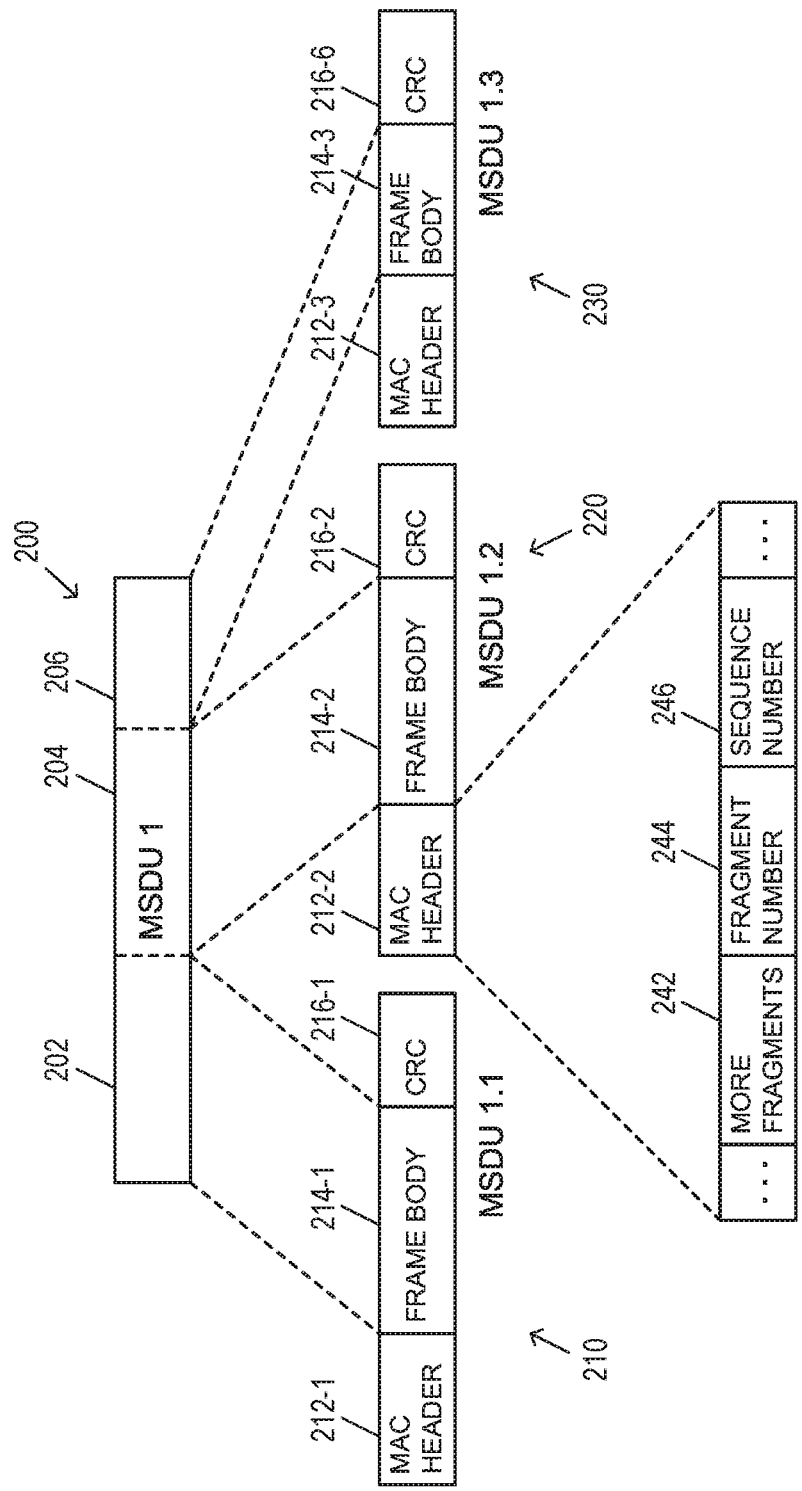
FIG. 2 is a diagram of an example medium access control (MAC) service data unit (MSDU) for fragmentation, according to an embodiment.

FIG. 2 is a diagram of an example medium access control (MAC) service data unit (MSDU) 200 for fragmentation, according to an embodiment. In general, MSDU or frame fragmentation is a MAC layer function that is designed to increase the reliability of transmitting frames across a wireless medium. In various embodiments and/or scenarios, an MSDU is divided into a plurality of fragments if the MSDU has a length that is longer than a predetermined fragmentation threshold. In an embodiment, the predetermined fragmentation threshold is a dot 11 Fragmentation Threshold as defined in the IEEE 802.11ax Standard or other suitable communication protocol. In the embodiment shown in FIG. 2, an originator (e.g., the AP 14 or client station 25) divides the MSDU 200 ("MSDU F") into three fragments, including a first fragment 202 (MSDU 1.1), an intermediate fragment 204 (MSDU 1.2), and an end fragment 206 (MSDU 1.3) and generates corresponding MPDUs 210, 220, and 230. As shown in FIG. 2 and utilized throughout the figures, MSDUs are numbered sequentially (i.e., MSDU1, MSDU2, etc.) and fragments are further numbered to indicate both the corresponding MPDU number and fragment number (i.e., MSDU 3.2, Fragment 3.2, or FRAG 3.2, corresponding to the second fragment of the third MSDU). In some embodiments, an originator transmits a single fragment per sequence number per A-MPDU (e.g., up to one fragment per MSDU for multiple MSDUs). In other embodiments, the originator transmits only a single fragment per A-MPDU. In still other embodiments, the originator transmits multiple fragments for an MSDU per A-MPDU.

Although three fragments are shown in FIG. 2, an MSDU is divided into two, four, five, or more fragments in other embodiments and/or scenarios. In some embodiments and/or scenarios, a fragment is further divided into two, three, or more sub-fragments, as described herein. In an embodiment, the length of the fragments of the plurality of fragments for an MSDU is an equal number of octets for each of the plurality of fragments except for the last fragment or "end fragment." In an embodiment, after an initial transmission of a fragment (e.g., the fragment 1.2 within MPDU 220), the content of the frame body 214-2 and the length of the MPDU 220 remain fixed until the corresponding fragment has been successfully delivered to an intended recipient (e.g., the AP 14 or client station 25). In some embodiments and/or scenarios, the length of the fragments of the plurality of fragments for an MSDU is not an equal number of octets for each of the plurality of fragments.

The MPDUs 210, 220, and 230 include respective MAC headers 212, frame bodies 214, and cyclic redundancy check (CRC) fields 216. In an embodiment, the MAC headers 212, frame bodies 214, and CRC fields 216 generally correspond to a suitable communication protocol or standard, for example, the IEEE 802.11ax Standard. In the embodiment shown in FIG. 2, the MAC headers 212 include a more fragments field 242, a fragment number field 244, and a sequence number field 246 (additional fields of the MAC header 212 are not shown for clarity). In an embodiment, the more fragments field 242 is contained within a Frame Control field (not shown) and the sequence number field 246 and the fragment number field 244 are contained within a Sequence Control field (not shown).

Sequence numbers (SN) are utilized to identify an MSDU and a fragment number (FN) is also used when an MSDU is fragmented. In an embodiment, the sequence number field 246 is a 12-bit field indicating the sequence number of an MSDU, aggregate MSDU (A-MSDU), or MAC management protocol data unit (MMPDU). An MSDU, A-MSDU, or MMPDU transmitted by a station is assigned a sequence number. In an embodiment, the fragment number field 244 is a 4-bit field indicating the number of each fragment of an MSDU or MMPDU. In an embodiment, the fragment number is set to 0 in a first fragment or an only fragment of an MSDU or MMPDU and is incremented by one for each successive fragment of that MSDU or MMPDU. The more fragments field 242 indicates whether a last fragment has been transmitted (e.g., a single bit with a "1" to indicate that the last fragment has been transmitted and a "0" to indicate that more fragments remain), and thus the fragment number field 244 and the more fragments field 242 identify the boundaries of an MSDU.

Figure 3:
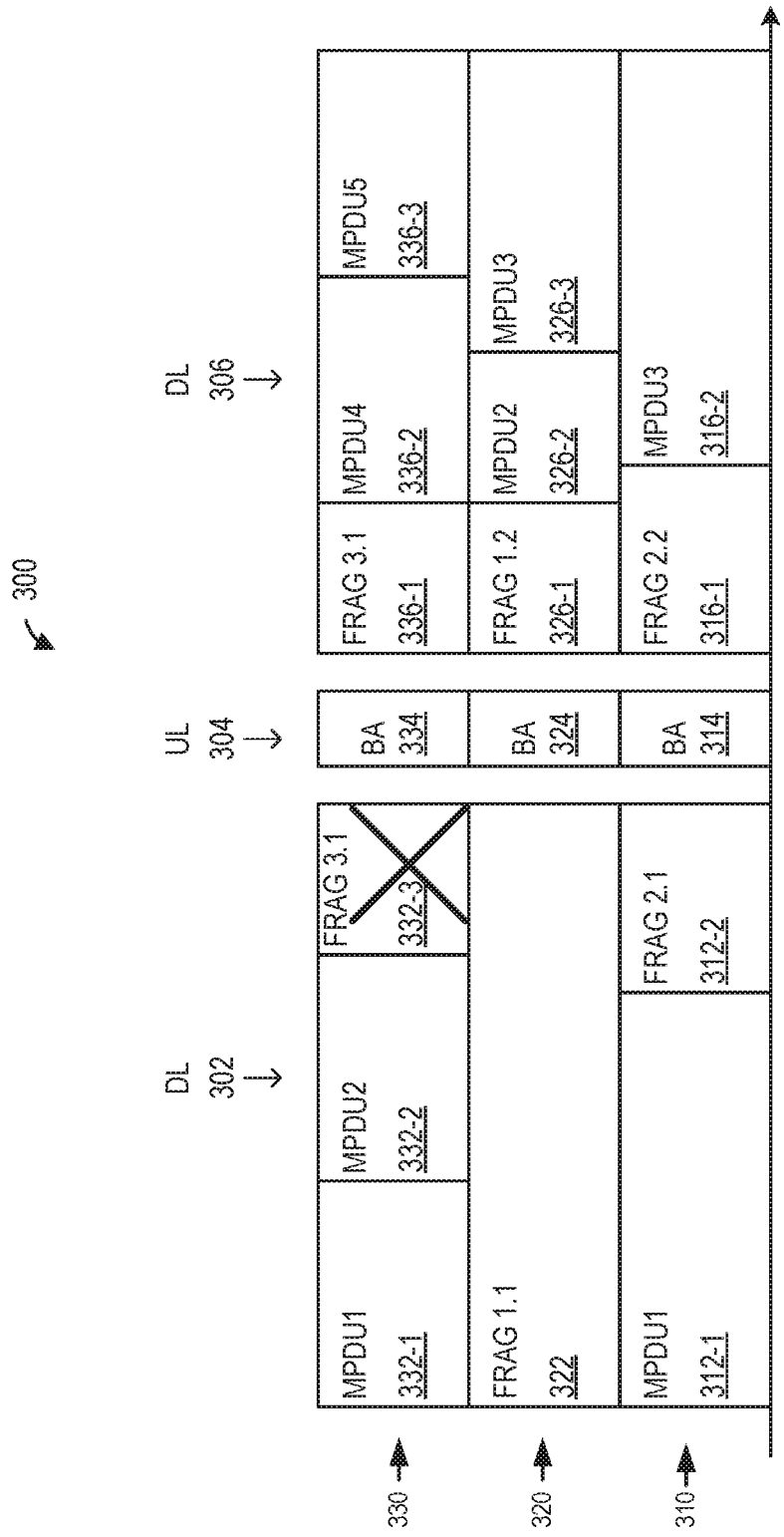
FIG. 3 is a diagram of an example frame exchange between an access point and a plurality of client stations, according to an embodiment.

FIG. 3 is a diagram of an example frame exchange 300 between an access point 14 and a plurality of client stations 25, according to an embodiment. In the embodiment shown in FIG. 3, the frame exchange 300 is a multi-user (MU) frame exchange that utilizes OFDMA data units. The frame exchange 300 includes physical layer (PHY) protocol data units (PPDUs) that include a first downlink (DL) OFDMA data unit 302, a second uplink (UL) OFDMA data unit 304, and a third downlink OFDMA data unit 306. In the embodiment shown in FIG. 3, some PHY fields (e.g., preamble fields, etc.) are not shown for clarity. In the embodiment shown in FIG. 3, the OFDMA data units 302, 304, and 306 are transmitted over an OFDMA channel having three sub-channels 310, 320, and 330 that are assigned to first, second, and third client stations 25, respectively, for transmission of OFDM data units. In some embodiments, the sub-channels 310, 320, and 330 conform to the first communication protocol and occupy respective 20 MHz bandwidths. In other embodiments, the sub-channels 310, 320, and 330 occupy other suitable bandwidths such as 2 MHz, 5 MHz, 10 MHz, 40 MHz, 80 MHz, 160 MHz, 320 MHz, 640 MHz, etc., for example, or other suitable bandwidths. While three sub-channels are shown, one, two, four, or more sub-channels are utilized, in other embodiments and/or scenarios. Although the embodiment shown in FIG. 3 utilizes a particular arrangement of MPDUs and fragments, other embodiments and/or scenarios utilize different arrangements according to data transfer needs of the originator and recipients, available network resources, etc.

The AP 14 is configured to transmit the OFDMA data units 302 and 304 to the client stations 25 via OFDM modulation and the client stations 25 are configured to transmit the OFDMA data unit 304 (or a portion thereof on an assigned sub-channel) to the AP 14, in an embodiment. In another embodiment, the AP 14 is configured to transmit the OFDMA data unit 304 to the client stations 25 via OFDM modulation and the client stations 25 are configured to transmit the OFDMA data units 302 and 306 (or a portion thereof on an assigned sub-channel) to the AP 14. In the embodiment shown in FIG. 3, the DL OFDMA data unit 302 includes a first OFDM data unit 312 on the first sub-channel 310, a second OFDM data unit 322 on the second sub-channel 320, and a third OFDM data unit 332 on the third sub-channel 330, etc. In an embodiment, padding (e.g., zero-padding) within one or more of the OFDM data units (e.g., OFDM data units 312, 322, 332, 316, 326, 336) is used to equalize the lengths of the OFDM data units, and to synchronize transmission of acknowledgment frames corresponding to the OFDMA data units 302 and 306.

In some embodiments and/or scenarios, an originator divides an MSDU into fragments and includes one fragment within an A-MPDU. In an embodiment, each A-MPDU includes at most one fragment which must be acknowledged with an immediate acknowledgment, otherwise the remaining fragments of the MSDU cannot be transmitted in the following A-MPDU. In other words, the AP 14 transmits the fragments of the MSDU in order and cannot transmit a next fragment until a current fragment has been acknowledged. In this embodiment, an unsuccessful transmission of a fragment delays the MSDU transmission. In the embodiment shown in FIG. 3, the AP 14 divides a third MSDU for the third client station into fragments, including a first fragment 3.1 (OFDM data unit 332-3) and one or more second fragments (e.g., a fragment 3.2, not shown). The AP 14 transmits a first OFDM data unit 332 including an A-MPDU with a first MPDU 332-2, a second MPDU 332-2, and a third MPDU 332-3 (including the fragment 3.1). In some scenarios, the first fragment 3.1 is not properly received and/or decoded by the client station. In this scenario, shown by the "X" in the MPDU 332-3, the client station provides a fragment acknowledgment data unit 334 in the uplink OFDMA data unit 304 that indicates a failed receipt of the MPDU 332-3. In various embodiments and/or scenarios, the indication of a failed receipt is a negative acknowledgment, an absence of a positive acknowledgment, or other suitable indication. The failed receipt of the MPDU 332-3 delays subsequent fragments of the third MSDU in some embodiments and/or scenarios. In an embodiment, for example, the AP 14 transmits only a single fragment per A-MPDU. In the embodiment shown in FIG. 3, the AP 14 retransmits the first fragment 3.1 in a second OFDM data unit 336. In this embodiment, the second OFDM data unit 336 includes an A-MPDU with the first fragment 3.1 in an MPDU 336-1, a fourth MPDU 336-2, and a fifth MPDU 336-3. In other words, a third downlink OFDM data unit (not shown) is needed to transmit the remaining fragment 3.2.

In some embodiments and/or scenarios, available radio resources (e.g., bandwidth and/or transmission opportunity duration) are insufficient for transmission of an entire MSDU or a fragment of an MSDU. In an embodiment, an originator divides a first MSDU into a plurality of fragments (or divides a fragment into sub-fragments) and transmits a single fragment for a recipient within an uplink or downlink MU PPDU. In an embodiment, the MU PPDU includes only one MPDU for the recipient of the fragment and the MPDU includes only the fragment. In other words, the MU PPDU is intended for multiple recipients, but the MPDU that contains the fragment occupies the entire duration of the MU PPDU (with or without padding). In the embodiment shown in FIG. 3, the AP 14 divides a first MSDU into a fragment 1.1 and a fragment 1.2. In an embodiment, the AP 14 generates a single MPDU 322 (e.g., a single VHT MPDU, a single HEW MPDU, or another suitable non-aggregated data unit) having a data portion that includes data from only the fragment 1.1. In an embodiment, the recipient (client station 25) generates a fragment acknowledgment data unit that acknowledges the single MPDU 322. In an embodiment, the fragment acknowledgment data unit is an acknowledgment frame in a single, non-aggregate MPDU 324.

In an embodiment, an originator divides an MSDU into a plurality of fragments and transmits a single fragment with other MPDUs for the recipient. In the embodiment shown in FIG. 3, the AP 14 divides a second MSDU into a first fragment 2.1 and a second fragment 2.2. The AP 14 generates an OFDM data unit 312 that includes an A-MPDU with a first MPDU 312-1 and the first fragment 2.1 as a second MPDU 312-2. In an embodiment, the recipient (e.g., client station 25) generates a fragment acknowledgment data unit that acknowledges the MPDU 312-1 and the MPDU 312-2. In an embodiment, the fragment acknowledgment data unit is a compressed block acknowledgment frame in a single, non-aggregate MPDU 314. In an embodiment, the originator includes only one fragment for a given sequence number in the A-MPDU. In an embodiment, a single bit in a block acknowledgment bitmap of the compressed block acknowledgment frame indicates a receipt status of the fragment 2.1. For example, a value of logic one (1) of a bit of the block acknowledgment bitmap indicates that the corresponding data unit was successfully received by the client station 25, and a value of logic zero (0) of a bit of the block acknowledgment bitmap indicates that the corresponding data unit was not successfully received (e.g., not received or received with an error) by the client station 25.

Figure 4:
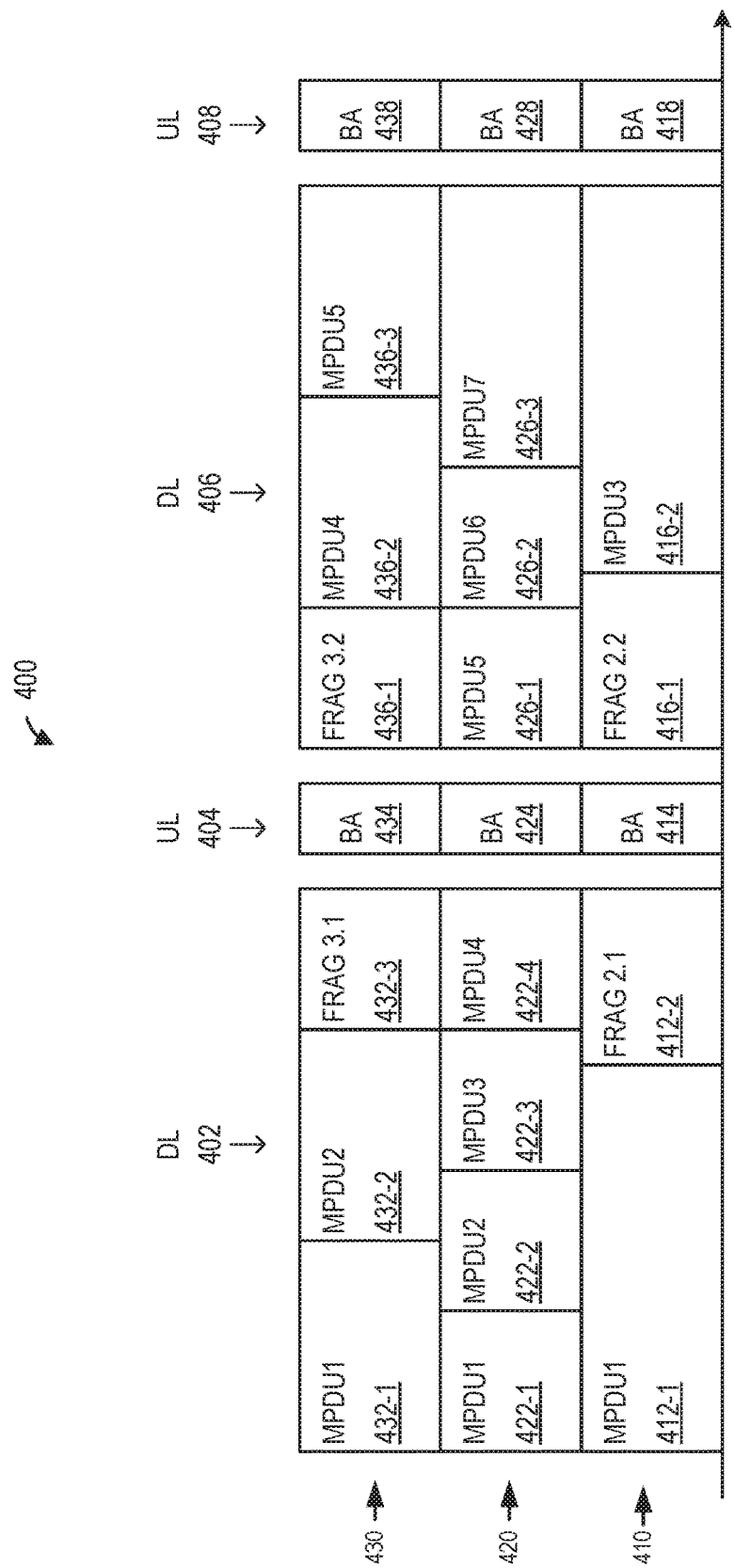
FIG. 4 is a diagram of an example frame exchange between an access point and a plurality of client stations, according to an embodiment.

FIG. 4 is a diagram of an example frame exchange 400 between an access point 14 and a plurality of client stations 25, according to an embodiment. In the embodiment shown in FIG. 4, the frame exchange 400 is a multi-user (MU) frame exchange that utilizes OFDMA data units 402, 404, 406, and 408 over sub-channels 410, 420, and 430, in a manner similar to that described above with respect to FIG. 3.

In some embodiments and/or scenarios, a single bit in a block acknowledgment bitmap of a compressed block acknowledgment frame indicates a receipt status of a plurality of fragments for a fragmented MSDU. In other words, a single fragment acknowledgment data unit is utilized to acknowledge the entire MSDU, instead of utilizing a separate acknowledgment for each fragment of the MSDU. In some embodiments, an originator receives a request for a block acknowledgment session that indicates a fragmentation type to be utilized for the block acknowledgment session. In an embodiment, the request is an ADDBA request that generally corresponds to an IEEE 802.11REVmc Standard, but additionally includes a field that indicates the fragmentation type. In an embodiment, the fragmentation type indicates whether separate acknowledgments or a single bit acknowledgment is utilized for the fragments.

In the embodiment shown in FIG. 4, the AP 14 divides a third MSDU for the third client station into a first fragment 3.1 and a second fragment 3.2. The AP 14 generates an OFDM data unit 432 that includes an A-MPDU with a first MPDU 432-1, a second MPDU 432-2, and the first fragment 3.1 as a third MPDU 432-3. In an embodiment, the recipient (e.g., client station 25) generates an acknowledgment data unit 434 that acknowledges receipt of the MPDU 432-1 and the MPDU 432-2 and omits acknowledgment of the receipt of the first fragment 3.1 (MPDU 432-3), even though the fragment 3.1 may be properly received and decoded. In an embodiment, the acknowledgment data unit 434 is a compressed block acknowledgment frame.

In this embodiment, the AP 14 generates an OFDM data unit 436 that includes an A-MPDU with the second fragment 3.2 (MPDU 436-1), a fourth MPDU 436-2, and a fifth MPDU 436-3, where the second fragment 3.2 is an end fragment of the plurality of fragments of the third MSDU. In various embodiments and/or scenarios, the AP 14 generates the OFDM data unit 436 to include an indication that each of the plurality of fragments of the third MSDU has been transmitted. In an embodiment, the indication is an indication of an immediate block acknowledgment policy for the MPDU 436-1. In another embodiment, the indication is a presence of an MSDU having a sequence number different from a sequence number of the third MSDU, for example, the MSDU of the fourth MPDU 436-2.

In response to the OFDM data unit 436, the recipient (e.g., client station 25) generates a fragment acknowledgment data unit 438 that acknowledges receipt of the second fragment 3.2 (MPDU 436-1), the fourth MPDU 436-2, and the fifth MPDU 436-3, in an embodiment. In some embodiments, the fragment acknowledgment data unit 438 is a compressed block acknowledgment frame having a single bit in a block acknowledgment bitmap that indicates a receipt status for the plurality of fragments of the third MSDU. For example, a value of logic one (1) of the bit of the block acknowledgment bitmap indicates that each of the plurality of fragments was successfully received by the client station 25, and a value of logic zero (0) of the bit of the block acknowledgment bitmap indicates that one or more of the plurality of fragments was not successfully received (e.g., not received or received with an error) by the client station 25. In some embodiments and/or scenarios, the AP 14 retransmits the plurality of fragments in response to an indication that one or more of the plurality of fragments was not successfully received. In an embodiment, the AP 14 retransmits the plurality of fragments using the same format of the MPDUs, for example, the AP 14 transmits the MPDU 432-3 and the MPDU 436-1 in separate OFDM data units (not shown).

Figure 5:
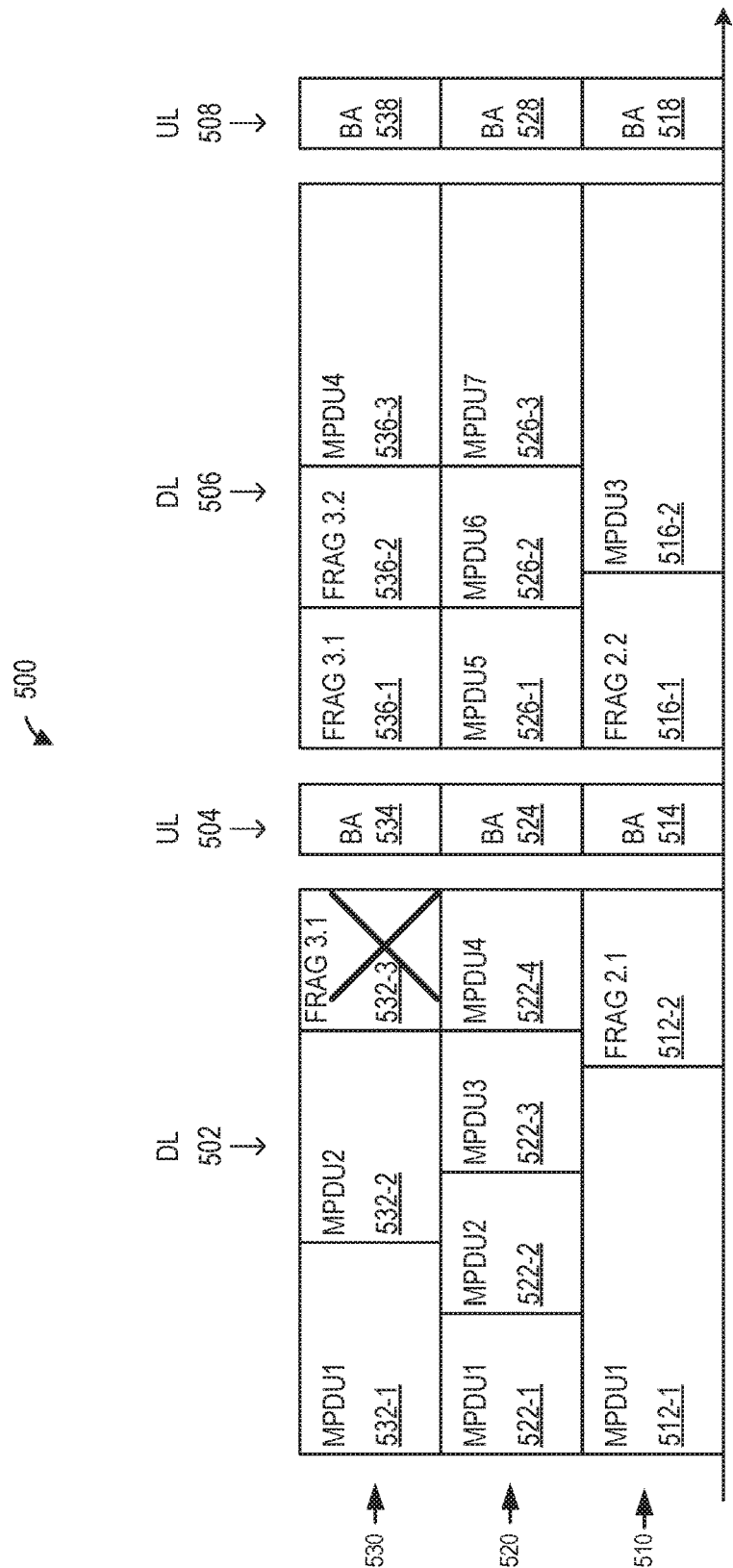
FIG. 5 is a diagram of an example frame exchange between an access point and a plurality of client stations, according to an embodiment.

FIG. 5 is a diagram of an example frame exchange 500 between an access point and a plurality of client stations, according to an embodiment. In the embodiment shown in FIG. 5, the frame exchange 500 is a multi-user (MU) frame exchange that utilizes OFDMA data units 502, 504, 506, and 508 over sub-channels 510, 520, and 530, in a manner similar to that described above with respect to FIG. 3.

In the embodiment shown in FIG. 5, an originator (e.g., the AP 14) divides a third MSDU for the third client station into fragments, including a first fragment 3.1 (OFDM data unit 532-3) and one or more second fragments (e.g., a fragment 3.2, OFDM data unit 536-2). The AP 14 transmits a first OFDM data unit 532 including an A-MPDU with a first MPDU 532-1, a second MPDU 532-2, and a third MPDU 532-3 (including the fragment 3.1). In some scenarios, the first fragment 3.1 is not properly received and/or decoded by the client station. In this scenario, shown by the "X" in the MPDU 532-3, the client station provides a fragment acknowledgment data unit 534 in the uplink OFDMA data unit 504 that indicates a failed receipt of the MPDU 532-3. In various embodiments and/or scenarios, the indication of a failed receipt is a negative acknowledgment, an absence of a positive acknowledgment, or other suitable indication.

In response to the indication of the failed receipt of the MPDU 532-3, the AP 14 retransmits the first fragment 3.1, in various embodiments and/or scenarios. In the embodiment shown in FIG. 5, the AP 14 retransmits the first fragment 3.1 along with the second fragment 3.2 in a same OFDM data unit 536. After creation of a plurality of fragments due to a restraint on the OFDM data unit 532, a removal of the restraint allows the AP 14 to transmit more than one of the plurality of fragments in a subsequent OFDM data unit (e.g., the OFDM data unit 536). In an embodiment, for example, by placing fragments starting at a beginning of an OFDM data unit, more or all of the fragments of the MSDU can be included as compared to placing the fragments at an end of the OFDM data unit (e.g., when placing a fragment to "fill up" a remainder of a transmission opportunity).

In an embodiment, the AP generates the second OFDM data unit 536 to include an A-MPDU with the first fragment 3.1 in an MPDU 536-1, the second fragment 3.2 in an MPDU 536-2, and a fourth MPDU 536-3. In response to the OFDM data unit 536, the recipient (e.g., client station 25) generates a fragment acknowledgment data unit 538 that acknowledges receipt of the plurality of fragments (MPDUs 536-1 and 536-2) and the fourth MPDU 536-3, in an embodiment. In some embodiments, the fragment acknowledgment data unit 538 is a compressed block acknowledgment frame having a single bit in a block acknowledgment bitmap that indicates a receipt status for the plurality of fragments of the third MSDU. In an embodiment, the use of the single bit in the compressed block acknowledgment frame allows multiple fragments to be included in a single A-MPDU. In some embodiments, the AP 14 generates and transmits a different MPDU (not shown) that includes the third MSDU in its entirety (e.g., not fragmented after defragmentation of fragment 3.1 and fragment 3.2), instead of including the third MSDU as the plurality of fragments in separate MPDUs.

Figure 6:
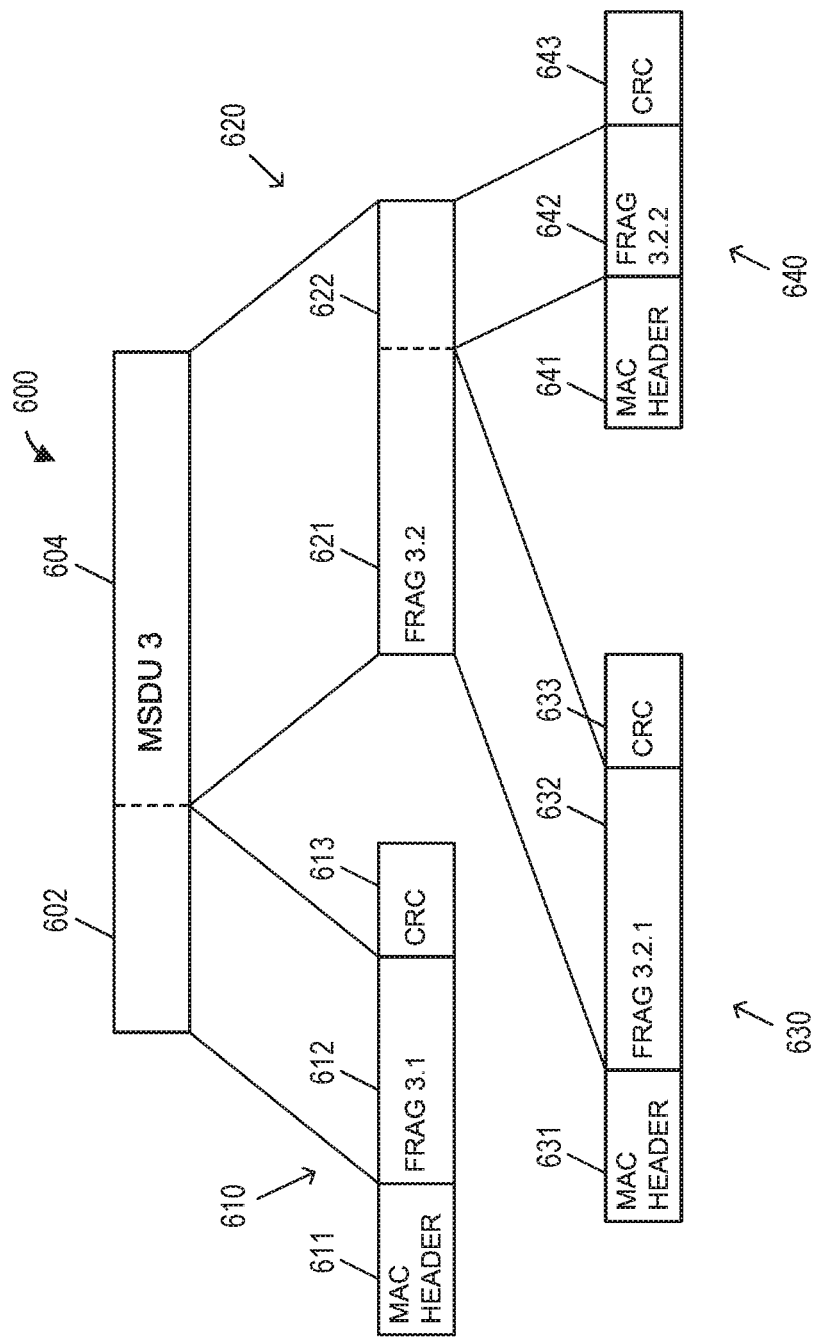
FIG. 6 is a diagram of an example MSDU for fragmentation, according to an embodiment.
Figure 7:
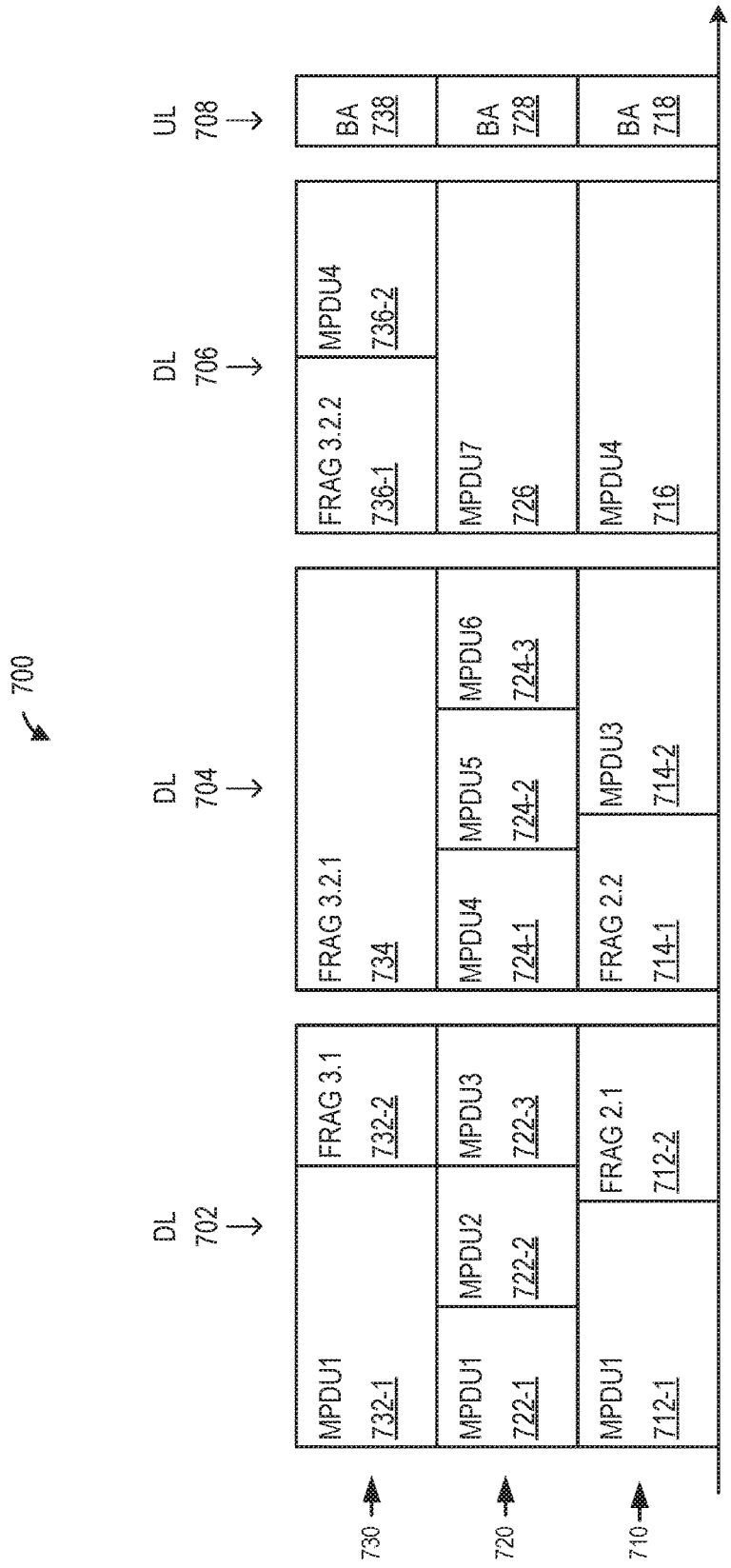
FIG. 7 is a diagram of an example frame exchange between an access point and a plurality of client stations, according to an embodiment.

FIG. 6 is a diagram of an example MSDU 600 for fragmentation, according to an embodiment. FIG. 7 is a diagram of an example frame exchange 700 between an access point and a plurality of client stations, according to an embodiment. In the embodiment shown in FIG. 7, the frame exchange 700 is a multi-user (MU) frame exchange that utilizes OFDMA data units 702, 704, 706, and 708 over sub-channels 710, 720, and 730, in a manner similar to that described above with respect to FIG. 3. In the embodiment shown in FIG. 7, the frame exchange 700 includes the MSDU 600 divided into fragments and sub-fragments for transmission utilizing one or more intermediate A-MPDUs, as described herein.

In the embodiment shown in FIG. 6, an originator (e.g., the AP 14 or client station 25) initially divides the MSDU 600 ("MSDU 3") into two fragments, for example, a first fragment 602 (FRAG 3.1) and a second fragment 604 (FRAG 3.2). In an embodiment, the originator generates a first MPDU 610 for the first fragment 602, where the first MPDU 610 includes a MAC header 611, a frame body 612, and a cyclic redundancy check field 613. In the embodiment shown in FIG. 7, the first MPDU 610 corresponds to the MPDU 732-2 of OFDM data unit 732.

In various embodiments and/or scenarios, the originator divides the second fragment into a plurality of sub-fragments. In one such embodiment, for example, the originator transmits the first MPDU 610 with the first fragment 602 at an end of an A-MPDU to "fill" an OFDM data unit, but a subsequent OFDM data unit does not have sufficient network resources (e.g., bandwidth, duration, data rate, etc.) for the entire second fragment 604. In the embodiment shown in FIG. 7, the AP 14 generates the OFDM data unit 732 to include an A-MPDU with an MPDU 732-1 and fills the OFDM data unit 732 with the MPDU 732-2 (e.g., with the first fragment 3.1). Where the subsequent OFDM data unit does not have sufficient network resources for a fragment, the originator further divides the MSDU (or a fragment of the MSDU) into additional fragments or sub-fragments. In other words, the MSDU is divided into a first fragment, followed by one more intermediate fragments, followed by an end fragment.

In an embodiment, the originator divides the second fragment 604 into a first sub-fragment 621 (FRAG 3.2.1) and a second sub-fragment 622 (FRAG 3.2.2) and generates i) a second MPDU 630 having a MAC header 631, a frame body 632 that includes the first sub-fragment 621, and a CRC field 633, and ii) a third MPDU 640 having a MAC header 641, a frame body 642 that includes the second sub-fragment 622, and a CRC field 643. In this embodiment, the second MPDU 630 is included in an intermediate A-MPDU of the OFDM data unit 734. While only one intermediate A-MPDU is shown, additional intermediate A-MPDUs are utilized in other embodiments, for example, where a fragment is divided into three, four, or more sub-fragments. In general, the intermediate A-MPDUs are received by the recipient after the first MPDU with the first fragment but before a last MPDU with an end fragment. In an embodiment, the MAC headers 611, 631, 641, frame bodies 612, 632, 642, and CRC fields 613, 633, and 643 generally correspond to a suitable communication protocol or standard, for example, the IEEE 802.11ax Standard. In the embodiment shown in FIG. 7, the AP 14 generates the OFDM data unit 734 to include an MPDU with the first sub-fragment 3.2.1 and generates the OFDM data unit 736 to include an MPDU 736-1 to include the second sub-fragment 3.2.2.

In the embodiment shown in FIG. 6, the originator divides the MSDU 600 into MPDUs 610, 630, and 640 for transmission to a recipient client station. In other embodiments and/or scenarios, the originator divides an MSDU into four, five, or more MPDUs. In an embodiment, the originator divides the MSDU into fragments and/or sub-fragments before transmitting any of the fragments and/or sub-fragments. In another embodiment, the originator divides the MSDU into fragments and/or sub-fragments as space is available within OFDM data units. In an embodiment, for example, the originator i) determines a first size of a frame body for a first MPDU based on available network resources, ii) divides the MSDU into a first fragment having the determined size and a remainder fragment, and iii) generates the first MPDU to include the first fragment. In this embodiment, the originator i) determines a subsequent size of a frame body for a subsequent MPDU based on available network resources, ii) if the subsequent size is less than or equal than a size of the remainder fragment, divides the remainder fragment into sub-fragments, and iii) generates the subsequent MPDU to include the remainder fragment or a sub-fragment. The originator further divides the remainder fragment and/or sub-fragments as needed, based on the available network resources, in an embodiment.

In the embodiment shown in FIG. 7, the recipient of the OFDM data units 732, 734, and 736 generates a fragment acknowledgment data unit 738 that acknowledges receipt of the plurality of fragments (MPDUs 732-2, 734, and 736-1), in an embodiment. In some embodiments, the fragment acknowledgment data unit 738 is a compressed block acknowledgment frame having a single bit in a block acknowledgment bitmap that indicates a receipt status for the plurality of fragments of the third MSDU. In other embodiments, the recipient provides separate acknowledgments (not shown) for each fragment in response to receipt of the fragment.

Figure 8:
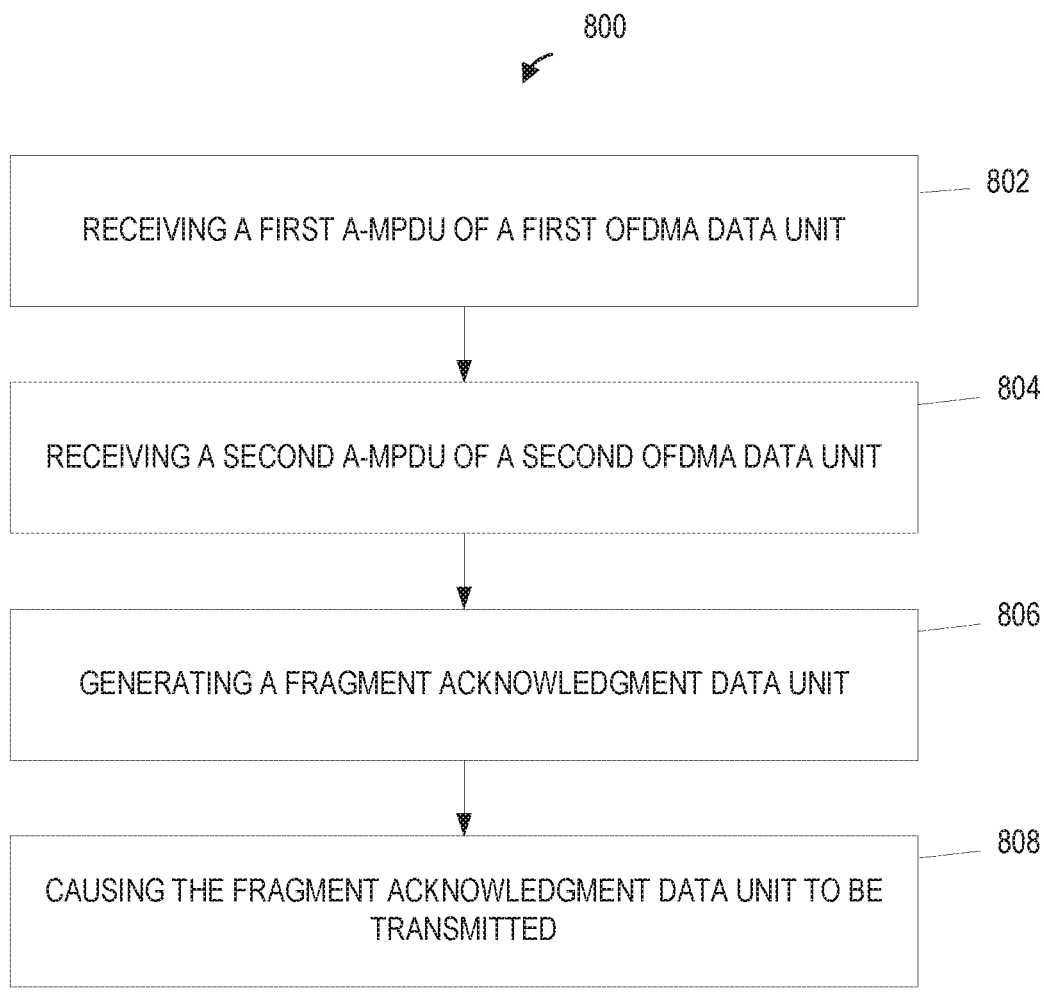
FIG. 8 is a flow diagram of an example method for acknowledging an MSDU, according to an embodiment.

FIG. 8 is a flow diagram of an example method 800 for acknowledging a first MSDU, according to an embodiment. In an embodiment, the method 800 is implemented by a client station in the WLAN, according to an embodiment. With reference to FIG. 1, the method 800 is implemented by the network interface 27, in an embodiment. For example, in one such embodiment, the PHY processor 29 is configured to implement the method 800. According to another embodiment, the MAC processing 28 is also configured to implement at least a part of the method 800. With continued reference to FIG. 1, in yet another embodiment, the method 800 is implemented by the network interface 16 (e.g., the PHY processor 20 and/or the MAC processor 18). In other embodiments, the method 800 is implemented by other suitable network interfaces.

At block 802, a first communication device receives a first aggregate MAC protocol data unit (A-MPDU) of a first orthogonal frequency division multiple access (OFDMA) data unit from a second communication device, in an embodiment. The first A-MPDU includes a first fragment of a plurality of fragments of the first MSDU. In various embodiments, the first A-MPDU is one of the A-MPDUs included in OFDM data units 312, 322, 332, 432, 532, or 732, or another suitable OFDM data unit. In an embodiment, the first communication device is the AP 14 and the second communication device is the client station 25. In another embodiment, the first communication device is the client station 25 and the second communication device is the AP 14.

At block 804, the first communication device receives a second A-MPDU of a second OFDMA data unit from the second communication device, in an embodiment. The second A-MPDU includes a second fragment of the plurality of fragments of the first MSDU and the second fragment is an end fragment of the plurality of fragments of the first MSDU. In various embodiments, the second A-MPDU is one of the A-MPDUs included in OFDM data unit 316, 326, 416, 436, 516, 536, or 736, or another suitable OFDM data unit.

At block 806, the first communication device generates a fragment acknowledgment data unit to acknowledge receipt of each of the plurality of fragments of the first MSDU, in an embodiment. In various embodiments, the fragment acknowledgment data unit is one of the fragment acknowledgment data units 418, 438, 518, 538, 718, 738, or another suitable fragment acknowledgment data unit.

At block 808, the first communication device causes the fragment acknowledgment data unit to be transmitted to the second communication device.

Figure 9:
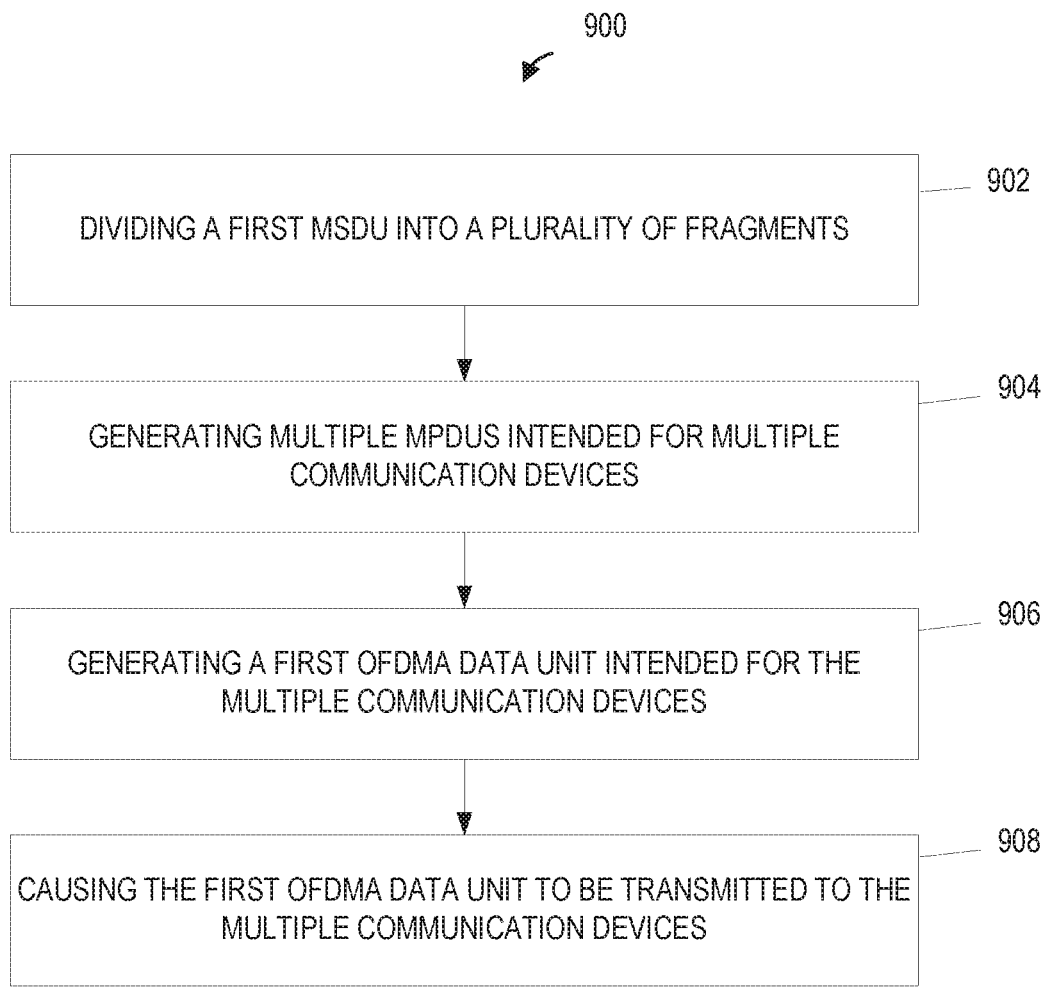
FIG. 9 is a flow diagram of an example method for simultaneously communicating with multiple communication devices in a wireless local area network, according to an embodiment.

FIG. 9 is a flow diagram of an example method 900 for simultaneously communicating with multiple communication devices in a wireless local area network, according to an embodiment. In an embodiment, the method 900 is implemented by a client station in the WLAN, according to an embodiment. With reference to FIG. 1, the method 900 is implemented by the network interface 27, in an embodiment. For example, in one such embodiment, the PHY processor 29 is configured to implement the method 900. According to another embodiment, the MAC processing 28 is also configured to implement at least a part of the method 900. With continued reference to FIG. 1, in yet another embodiment, the method 900 is implemented by the network interface 16 (e.g., the PHY processor 20 and/or the MAC processor 18). In other embodiments, the method 900 is implemented by other suitable network interfaces.

At block 902, a first medium access control (MAC) service data unit (MSDU) is divided at a first communication device into a plurality of fragments, in an embodiment. The first MSDU is intended for a second communication device of the multiple communication devices. In an embodiment, the first communication device is the AP 14 and the second communication device is the client station 25. In another embodiment, the first communication device is the client station 25 and the second communication device is the AP 14. In an embodiment, the first MSDU is one of the MSDU 200 or MSDU 600.

At block 904, multiple MAC protocol data units (MPDUs) intended for the multiple communication devices are generated at the first communication device, in an embodiment. The multiple MPDUs include a first MPDU that includes a first fragment of the plurality of fragments and is an only MPDU of the multiple MPDUs intended for the second communication device. In an embodiment, the first MPDU is the MPDU 322.

At block 906, a first orthogonal frequency division multiple access (OFDMA) data unit that includes the multiple MPDUs intended for the multiple communication devices is generated at the first communication device. In an embodiment, the first OFDMA data unit is the OFDMA data unit 302.

At block 908, the first OFDMA data unit is caused to be transmitted to the multiple communication devices by the first communication device.

Further aspects of the present invention relate to one or more of the following clauses.

In an embodiment, a method for acknowledging a first medium access control (MAC) service data unit (MSDU) includes: receiving, at a first communication device and from a second communication device, a first aggregate MAC protocol data unit (A-MPDU) of a first orthogonal frequency division multiple access (OFDMA) data unit, wherein the first A-MPDU includes a first fragment of a plurality of fragments of the first MSDU; receiving, at the first communication device and from the second communication device, a second A-MPDU of a second OFDMA data unit, wherein the second A-MPDU includes a second fragment of the plurality of fragments of the first MSDU and the second fragment is an end fragment of the plurality of fragments of the first MSDU; generating, by the first communication device, a fragment acknowledgment data unit to acknowledge receipt of each of the plurality of fragments of the first MSDU; and causing, by the first communication device, the fragment acknowledgment data unit to be transmitted to the second communication device.

In other embodiments, the method includes any suitable combination of one or more of the following features.

In an embodiment, the second A-MPDU includes an indication that each of the plurality of fragments of the first MSDU has been transmitted. Generating the fragment acknowledgment data unit includes generating the fragment acknowledgment data unit in response to the indication that each of the plurality of fragments of the first MSDU have been transmitted.

In an embodiment, the indication that each of the plurality of fragments of the first MSDU have been transmitted is a presence of a second MSDU having a sequence number different from a sequence number of the first MSDU.

In an embodiment, the indication that each of the plurality of fragments of the first MSDU have been transmitted is an indication of an immediate block acknowledgment policy for the second fragment.

In an embodiment, the first A-MPDU includes one or more second MSDUs. The method also includes generating, by the first communication device, a first acknowledgment data unit that acknowledges receipt of the one or more second MSDUs and omits acknowledgment of the receipt of the first fragment, and causing, by the first communication device, the first acknowledgment data unit to be transmitted to the second communication device before receiving the second A-MPDU.

In an embodiment, the fragment acknowledgment data unit is a block acknowledgment data unit having a block acknowledgment bitmap and a single bit in the block acknowledgment bitmap indicates a receipt status for the plurality of fragments of the first MSDU.

In an embodiment, the method also includes receiving, at the first communication device and from the second communication device, one or more intermediate A-MPDUs. Each of the one or more intermediate A-MPDUs includes a respective intermediate fragment of the plurality of fragments of the first MSDU. Each of the one or more intermediate A-MPDUs is received after the first A-MPDU and before the second A-MPDU. The fragment acknowledgment data unit acknowledges receipt of the first fragment, the one or more intermediate fragments, and the second fragment.

In an embodiment, the second A-MPDU includes the first fragment and the second fragment. The fragment acknowledgment data unit includes a single bit that acknowledges receipt of the first fragment and the second fragment.

In an embodiment, the method also includes receiving a request for a block acknowledgment session that indicates a fragmentation type for the block acknowledgment session.

In an embodiment, a first communication device for acknowledging a first medium access control (MAC) service data unit (MSDU) includes a network interface device having one or more integrated circuits. The one or more integrated circuits are configured to receive, from a second communication device, a first aggregate MAC protocol data unit (A-MPDU) of a first orthogonal frequency division multiple access (OFDMA) data unit, wherein the first A-MPDU includes a first fragment of a plurality of fragments of the first MSDU, receive, from the second communication device, a second A-MPDU of a second OFDMA data unit, wherein the second A-MPDU includes a second fragment of the plurality of fragments of the first MSDU and the second fragment is an end fragment of the plurality of fragments of the first MSDU, generate a fragment acknowledgment data unit to acknowledge receipt of each of the plurality of fragments of the first MSDU, and cause the fragment acknowledgment data unit to be transmitted to the second communication device.

In other embodiments, the first communication device includes any suitable combination of one or more of the following features.

In an embodiment, the second A-MPDU includes an indication that each of the plurality of fragments of the first MSDU have been transmitted; and the one or more integrated circuits are configured to generate the fragment acknowledgment data unit in response to the indication that each of the plurality of fragments of the first MSDU have been transmitted.

In an embodiment, the first A-MPDU includes one or more second MSDUs; the one or more integrated circuits are configured to: generate a first acknowledgment data unit that acknowledges receipt of the one or more second MSDUs and omits acknowledgment of the receipt of the first fragment, and cause the first acknowledgment data unit to be transmitted to the second communication device before receiving the second A-MPDU.

In an embodiment, the fragment acknowledgment data unit is a block acknowledgment data unit having a block acknowledgment bitmap; and a single bit in the block acknowledgment bitmap indicates a receipt status for the plurality of fragments of the first MSDU.

In an embodiment, a method for simultaneously communicating with multiple communication devices in a wireless local area network includes: dividing, at a first communication device, a first medium access control (MAC) service data unit (MSDU) into a plurality of fragments, wherein the first MSDU is intended for a second communication device of the multiple communication devices; generating, at the first communication device, multiple MAC protocol data units (MPDUs) intended for the multiple communication devices, wherein the multiple MPDUs include a first MPDU that includes a first fragment of the plurality of fragments and is an only MPDU of the multiple MPDUs intended for the second communication device; generating, at the first communication device, a first orthogonal frequency division multiple access (OFDMA) data unit that includes the multiple MPDUs intended for the multiple communication devices; causing, by the first communication device, the first OFDMA data unit to be transmitted to the multiple communication devices.

In other embodiments, the method includes any suitable combination of one or more of the following features.

In an embodiment, the first MPDU is a single, non-aggregate MPDU having a data portion that includes data from only the first fragment; and the method also includes receiving a second OFDMA data unit that includes an acknowledgment data unit transmitted by the second communication device that acknowledges the first MPDU, wherein the acknowledgment data unit is a single, non-aggregate MPDU.

In an embodiment, the first MPDU is an aggregate MPDU (A-MPDU) that includes the first fragment; and the method also includes receiving a second OFDMA data unit that includes an acknowledgment data unit transmitted by the second communication device that acknowledges the first MPDU, wherein the acknowledgment data unit is a compressed block acknowledgment.

In an embodiment, generating the multiple MPDUs includes generating the A-MPDU to include a single fragment per sequence number.

In an embodiment, the compressed block acknowledgment includes a block acknowledgment bitmap having a single bit that indicates a receipt status of the first fragment.

In an embodiment, a first communication device for simultaneously communicating with multiple communication devices in a wireless local area network includes a network interface device having one or more integrated circuits. The one or more integrated circuits are configured to: divide a first medium access control (MAC) service data unit (MSDU) into a plurality of fragments, wherein the first MSDU is intended for a second communication device of the multiple communication devices, generate multiple MAC protocol data units (MPDUs) intended for the multiple communication devices, wherein the multiple MPDUs include a first MPDU that includes a first fragment of the plurality of fragments and is an only MPDU of the multiple MPDUs intended for the second communication device, generate a first orthogonal frequency division multiple access (OFDMA) data unit that includes the multiple MPDUs, and cause the first OFDMA data unit to be transmitted to the multiple communication devices.

In other embodiments, the first communication device includes any suitable combination of one or more of the following features.

In an embodiment, the first MPDU is a single, non-aggregate MPDU having a data portion that includes data from only the first fragment; and the one or more integrated circuits are configured to receive a second OFDMA data unit that includes an acknowledgment data unit transmitted by the second communication device that acknowledges the first MPDU, wherein the acknowledgment data unit is a single, non-aggregate MPDU.

In an embodiment, a method for simultaneously communicating with multiple communication devices in a wireless local area network includes: dividing, at a first communication device, a first medium access control (MAC) service data unit (MSDU) into a plurality of fragments, wherein the first MSDU is intended for a second communication device of the multiple communication devices; generating, at the first communication device, first multiple MAC protocol data units (MPDUs) intended for the multiple communication devices, wherein the first multiple MPDUs include a first MPDU that includes a first fragment of the plurality of fragments and is intended for the second communication device; generating, at the first communication device, a first orthogonal frequency division multiple access (OFDMA) data unit that includes the first multiple MPDUs intended for the multiple communication devices; causing, by the first communication device, the first OFDMA data unit to be transmitted to the multiple communication devices; generating, at the first communication device, second multiple MAC protocol data units (MPDUs) intended for the multiple communication devices, wherein the second multiple MPDUs include a second MPDU that includes the first MSDU in its entirety and is intended for the second communication device; generating, at the first communication device, a second orthogonal frequency division multiple access (OFDMA) data unit that includes the second multiple MPDUs intended for the multiple communication devices; and causing, by the first communication device, the second OFDMA data unit to be transmitted to the multiple communication devices.

In other embodiments, the method includes any suitable combination of one or more of the following features.

In an embodiment, the method also includes determining, at the first communication device, that the second communication device has not properly received or decoded the first MPDU; and generating the second MPDU in response to the determination that the second communication device has not properly received or decode the first MPDU.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for simultaneously communicating with multiple communication devices in a wireless local area network, the method comprising:
   dividing, at a first communication device, a first medium access control (MAC) service data unit (MSDU) into a plurality of fragments, wherein the first MSDU is intended for a second communication device of the multiple communication devices;
   generating, at the first communication device, first multiple MAC protocol data units (MPDUs) intended for the multiple communication devices, wherein the first multiple MPDUs include a first MPDU that includes a first fragment of the plurality of fragments and is an only MPDU of the first multiple MPDUs intended for the second communication device;

generating, at the first communication device, a first orthogonal frequency division multiple access (OFDMA) data unit that includes the first multiple MPDUs intended for the multiple communication devices;

causing, by the first communication device, the first OFDMA data unit to be transmitted to the multiple communication devices;

generating, at the first communication device, second multiple MPDUs intended for the multiple communication devices, wherein the second multiple MPDUs include a second MPDU that includes a second fragment of the plurality of fragments;

generating, at the first communication device, a second OFDMA data unit that includes the second multiple MPDUs intended for the multiple communication devices;

causing, by the first communication device, the second OFDMA data unit to be transmitted to the multiple communication devices before receipt of an acknowledgment data unit, from the second communication device, that acknowledges the first fragment.

2. The method of claim 1, wherein:
the first MPDU is a single, non-aggregate MPDU having a data portion that includes data from only the first fragment.

3. The method of claim 1, wherein:
the first MPDU is an aggregate MPDU (A-MPDU) that includes the first fragment.

4. The method of claim 3, wherein generating the first multiple MPDUs comprises generating the A-MPDU to include a single fragment per sequence number.

5. The method of claim 1, wherein the method further comprises:
receiving, at the first communication device, a compressed block acknowledgment for the second OFDMA data unit, the compressed block acknowledgment including a block acknowledgment bitmap having a single bit that indicates a receipt status of both the first fragment and the second fragment.

6. A first communication device for simultaneously communicating with multiple communication devices in a wireless local area network, the first communication device comprising:
a network interface device having one or more integrated circuits configured to divide a first medium access control (MAC) service data unit (MSDU) into a plurality of fragments, wherein the first MSDU is intended for a second communication device of the multiple communication devices, generate first multiple MAC protocol data units (MPDUs) intended for the multiple communication devices, wherein the first multiple MPDUs include a first MPDU that includes a first fragment of the plurality of fragments and is an only MPDU of the first multiple MPDUs intended for the second communication device, generate a first orthogonal frequency division multiple access (OFDMA) data unit that includes the first multiple MPDUs, cause the first OFDMA data unit to be transmitted to the multiple communication devices, generate second multiple MPDUs intended for the multiple communication devices, wherein the second multiple MPDUs include a second MPDU that includes a second fragment of the plurality of fragments;

generate a second OFDMA data unit that includes the second multiple MPDUs intended for the multiple communication devices;

cause the second OFDMA data unit to be transmitted to the multiple communication devices before receipt of an acknowledgment data unit, from the second communication device, that acknowledges the first fragment.

7. The first communication device of claim 6, wherein:
the first MPDU is a single, non-aggregate MPDU having a data portion that includes data from only the first fragment.

8. The first communication device of claim 6, wherein:
the first MPDU is an aggregate MPDU (A-MPDU) that includes the first fragment.

9. The first communication device of claim 8, wherein the one or more integrated circuits are configured to generate the A-MPDU to include a single fragment per sequence number.

10. The first communication device of claim 6, wherein the one or more integrated circuits are configured to receive a compressed block acknowledgment for the second OFDMA data unit, the compressed block acknowledgment including a block acknowledgment bitmap having a single bit that indicates a receipt status of both the first fragment and the second fragment.

\* \* \* \* \*